(12) United States Patent
Dillon et al.

(10) Patent No.: US 7,676,681 B2
(45) Date of Patent: Mar. 9, 2010

(54) METHOD, SYSTEM, AND APPARATUS FOR IDENTIFICATION NUMBER AUTHENTICATION

(75) Inventors: Pattie Suozzi Dillon, Little Genesee, NY (US); James M. Giordano, Winter Park, FL (US); Kenneth A. Galle, Alfred Station, NY (US)

(73) Assignee: Veratad Technologies, LLC, Englewood, NJ (US)

( * ) Notice: Subject to any disclaimer, the term of this patent is extended or adjusted under 35 U.S.C. 154(b) by 781 days.

(21) Appl. No.: 10/250,249

(22) Filed: Jun. 17, 2003

(65) Prior Publication Data

US 2005/0005113 A1    Jan. 6, 2005

(51) Int. Cl.
*G06F 21/00* (2006.01)

(52) U.S. Cl. .............. 713/182; 726/4; 726/5; 726/7; 726/19; 705/44; 705/67; 705/76

(58) Field of Classification Search ............ None
See application file for complete search history.

(56) References Cited

U.S. PATENT DOCUMENTS

| | | | |
|---|---|---|---|
| 4,198,619 A | 4/1980 | Atalla | |
| 4,652,698 A | 3/1987 | Hale et al. | |
| 4,679,236 A | 7/1987 | Davies | |
| 4,745,267 A | 5/1988 | Davis et al. | |
| 4,992,783 A | 2/1991 | Zdunek et al. | |
| 5,093,861 A | 3/1992 | Graham | |
| 5,555,303 A | 9/1996 | Stambler | |
| 5,655,020 A | 8/1997 | Powers | |
| 5,754,652 A | 5/1998 | Wilfong | |
| 5,754,653 A | 5/1998 | Canfield | |
| 5,940,511 A * | 8/1999 | Wilfong | 713/183 |
| 5,956,699 A | 9/1999 | Wong et al. | |
| 6,009,411 A * | 12/1999 | Kepecs | 705/14 |
| 6,055,635 A | 4/2000 | Karlsson | |
| 6,058,189 A | 5/2000 | Mc Gough | |
| 6,070,154 A | 5/2000 | Tavor et al. | |
| 6,108,636 A * | 8/2000 | Yap et al. | 705/5 |
| 6,108,644 A | 8/2000 | Goldschlag et al. | |
| 6,282,658 B2 | 8/2001 | French et al. | |
| 7,392,388 B2 * | 6/2008 | Keech | 713/170 |
| 2001/0038693 A1 * | 11/2001 | Luyster | 380/37 |
| 2001/0051928 A1 * | 12/2001 | Brody | 705/52 |
| 2002/0032662 A1 | 3/2002 | Maclin et al. | |
| 2002/0051119 A1 | 5/2002 | Sherman et al. | |
| 2002/0073321 A1 | 6/2002 | Kinsella | |

(Continued)

OTHER PUBLICATIONS

Schneier, Bruce, "Applied Cryptography, Second Edition, Protocols, Algorithms, and Source Code in C," John Wiley & Sons, Inc., New York City, © 1996, p. 10.

*Primary Examiner*—Minh Dinh
(74) *Attorney, Agent, or Firm*—Simpson & Simpson, PLLC (57) ABSTRACT

A computer based method, system and apparatus of authentication which compares a first number associated with a user with a second number, wherein the second number is a mathematical function of at least two predetermined digits within the user's identification number, preferably a Social Security Number. A computer based method, system and apparatus for authenticating a user's identification number, which compares a first code associated with a user with a second code, wherein said second code is an alphabetic translation of at least two predetermined digits within the user's identification number.

18 Claims, 8 Drawing Sheets

U.S. PATENT DOCUMENTS

| | | | |
|---|---|---|---|
| 2002/0078353 A1* | 6/2002 | Sandhu et al. ............... | 713/170 |
| 2003/0014672 A1 | 1/2003 | Desikamani et al. | |
| 2003/0021417 A1 | 1/2003 | Vasic et al. | |
| 2003/0038707 A1* | 2/2003 | Geller ........................ | 340/5.8 |
| 2003/0070074 A1* | 4/2003 | Geller et al. ................. | 713/168 |
| 2003/0120922 A1* | 6/2003 | Sun et al. .................... | 713/168 |
| 2003/0131102 A1 | 7/2003 | Umbreit | |
| 2004/0044739 A1* | 3/2004 | Ziegler ....................... | 709/213 |
| 2004/0236702 A1* | 11/2004 | Fink et al. .................... | 705/73 |

* cited by examiner

METHOD, SYSTEM, AND APPARATUS FOR IDENTIFICATION NUMBER AUTHENTICATION

REFERENCE TO COMPUTER PROGRAM LISTING APPENDIX

The present application includes a computer program listing appendix. The appendix contains an ASCII text file of the computer program listing as follows:
Filename: ETAP101US5341-USCOMP.txt
Size: 2 kilobytes
Date Created: Jun. 17, 2003
The computer program listing appendix is hereby expressly incorporated by reference in the present application.

FIELD OF THE INVENTION

This invention relates generally to a method, system and apparatus for identification number authentication, more particularly, to a method, system and apparatus for non-intrusively verifying a user's social security number.

BACKGROUND OF THE INVENTION

The present invention relates generally to authenticating identification numbers. Often people are leery of divulging user identification numbers, such as social security numbers, on remote or public terminals such as the internet or telephone operators, or even placing them on documents. For instance, a person using the internet to purchase goods may be asked to provide both publicly accessible information such as name and address along with a private user identification number such as a social security number (SSN), or a personal identification number (PIN). One problem with this scenario is that the user may not wish to reveal such information because of concerns about identity theft, maintaining privacy, and unauthorized third party use.

The Federal Trade Commission has noted that misuse of personal identifying information can result in temporary and sometimes permanent financial loss when wages are garnished, tax refunds are withheld, or liens are placed on victims' property as a result of someone else's criminal use of their identity. Beyond direct financial loss, consumers report being denied employment, credit, loans (including mortgages and student loans), government benefits, utility and telecommunications services, and apartment leases when credit reports and background checks are littered with the fraudulently incurred debts or wrongful criminal records of an identity thief. A SSN is especially vulnerable as it is a unique "person identifier" used by many agencies to track information such as credit or employment histories.

Recent legislation relating to identity theft includes the Federal Trade Commission Act, 15 U.S.C. §41 et seq. (prohibiting deceptive or unfair acts or practices, including violations of stated privacy policies); Fair Credit Reporting Act, 15 U.S.C. §1681 et seq. (addressing the accuracy, dissemination, and integrity of consumer reports); Children's Online Privacy Protection Act, 15 U.S.C. §6501 et seq. (prohibiting the collection of personally identifiable information from young children without their parents' consent); Identify Theft and Assumption Deterrence Act of 1998, 18 U.S.C. §1028 (directing the FTC to collect identity theft complaints, refer them to the appropriate credit bureaus and law enforcement agencies, and provide victim assistance); Gramm-Leach-Bliley Act, 15 U.S.C. §6801 et seq. (requiring financial institutions to provide notices to consumers and allowing consumers (with some exceptions) to choose whether their financial institutions may share their information with third parties).

Under all of this legislation, parties attempting to verify user identity may be severely limited in their access and use of such information. Thus, currently available methods for authenticating a user's identification number suffer from a lack of security and user privacy because other parties may intercept information, thus providing unauthorized and illegal access to these numbers. Also, parties with the legitimate need for this information or concerned about trying to protect themselves from fraudulent transactions, need a non-invasive method for authenticating a user identification number. A variety of methods, systems and apparatus for verifying a user identification number are known in the art.

U.S. Pat. No. 4,198,619 (Atalla) discloses a method of operating a personal verification system. The logic module receives an account code word (or any other data that is specific for an individual) and a secret code word from an individual for encoding in accordance with a logical combination of such code words altered in accordance with a selectable control word to produce a compiled code word of fixed length. There is no teaching that the second number/code being compared is a mathematical function of at least two predetermined digits within a users identification number.

U.S. Pat. No. 4,697,236 (Davies) discloses a secure system for identification verification by transmission of an access number, preferably a random number, from a central processor to a remote terminal. The system provides portable identification devices for use by individuals, programmed to perform specified mathematical functions on data input thereto. The portable devices may be cumbersome, expensive and difficult to modify since changes must be coordinated with the central processor. Also, there is no teaching of comparing a first number associated with a user with a second number, wherein the second number is a mathematical function of at least two predetermined digits of the user's identification number.

U.S. Pat. No. 4,992,783 (Zdunek et al.) teaches a method and apparatus for controlling access to a two-way communication system. The invention requires the use of both numbers and password codes in the subscriber units. Thus, it does not teach a method of authentication using a single user identification number.

U.S. Pat. No. 5,093,861 (Graham) discloses a method of authentication wherein a user identification number is coordinated with an associated pin code number. There is no teaching of a method of authentication of the user's identification number.

U.S. Pat. No. 5,555,303 (Stambler) teaches a secret transaction system which uses a joint code derived from a transaction, document, or thing to code information. The system involves a comparison of re-derived information against information recorded on the document to authenticate the accuracy of that information. Thus, there is no teaching of comparing a first number associated with a user with a second number, wherein the second number is a mathematical function of at least two predetermined digits of the user's identification number.

U.S. Pat. No. 5,655,020 (Powers) shows a system and method for authenticating the identity of an authorized person. The algorithm involves the generation of a second code that has more character positions than the first code. Again, there is no teaching of user authentication based on mathematical functions involving at least two predetermined digits of a user's identification number.

U.S. Pat. Nos. 5,754,652 and 5,940,511 (Wilfong) disclose a method and apparatus for secure PIN entry in which the user sequentially encodes each digit of number, one digit at a time. There is no teaching of non-sequentially encoding user identification numbers by modifying at least two digits within the user's identification number.

U.S. Pat. No. 5,754,653 (Canfield) teaches a coding formula for verifying checks and credit cards. The formula involves a numerical base code which is divided into two parts. Then the check number or transaction amount is modified by an assigned mathematical mode and each of the two parts of the base code. There is no teaching of comparing a first number associated with a user with a second number, wherein the second number is a mathematical function of at least two predetermined digits of the user's identification number.

U.S. Pat. No. 5,956,699 (Wong et al.) relates to a system for secure credit card transaction on the internet. The system generates a personal charge number from the user account number by inserting a user key into the user account number. Thus, it fails to teach user authentication based on mathematical functions involving at least two predetermined digits of a user's identification number.

U.S. Pat. No. 6,108,644 (Goldschlag et al.) discloses a system and method for electronic transactions, which uses an unblinded validated certificate and a blinded unvalidated certification. There is no teaching of user authentication based on mathematical functions involving at least two predetermined digits of a user's identification number.

United States Patent Application No. 2002/0073321 (Kinsella) discloses a method for fraud prevention for remote transactions in which a "scramble key" is generated. The user then generates an input code by modifying their user code in accordance with the scramble key. The user code and the input code are compared and authentication occurs if the user is determined to have used the user code to generate the input code. The scramble key is applied to all or parts of the user code but there is no teaching of the scramble key being a mathematical function that includes only predetermined digits within the user's identification number.

What is needed, then, is a non-intrusive method and apparatus for authenticating a user's identification that utilizes the user's Social Security Number.

SUMMARY OF THE INVENTION

The present invention broadly comprises a method and apparatus for authenticating a user's identification that utilizes the user's Social Security Number.

In preferred embodiments, the present invention includes a computer based method of authentication. The method includes the steps of displaying a field operatively arranged for entry of data representative of a mathematical function of digits in a person's Social Security Number and displaying instructions to the person indicating a specific mathematical function to be performed by the person to arrive at the representative data. The method also includes displaying a field operatively arranged for entry of other data representative of the identity of said person. The method also includes receiving the data representative of the mathematical function of digits in the person's Social Security Number, as well as receiving other data representative of the identity of the person. Additionally, the method includes determining the person's Social Security Number from the other data representative of the identity of the person, wherein the determining is accomplished by a lookup process in a database. The method further includes performing the specific mathematical function of digits in the person's Social Security Number, and comparing a result of the performing the specific mathematical function of digits in the person's Social Security Number with the received data representative of the mathematical function of digits in the person's Social Security Number to authenticate the person's identity.

In additional embodiments, the steps of displaying a field operatively arranged for entry of data representative of a mathematical function of digits in a person's Social Security Number, displaying instructions to said person, and displaying a field operatively arranged for entry of other data representative of the identity of said person occur substantially simultaneously.

In further embodiments the specific mathematical function is selected from a group consisting of addition, subtraction, division, multiplication, and combinations thereof. In some embodiments the other data is selected from a group consisting of the person's first and last name, bill to and ship to addresses, phone number, and combinations thereof.

In additional embodiments, the database includes a plurality of entries, each of the entries identifying one individual. The entries including at least the individual's Social Security Number and the individual's other data. The other data being selected from a group consisting of the individual's first and last name, bill to and ship to addresses, phone number, and combinations thereof.

In some embodiments, a transaction can be authorized or denied dependent upon whether the person's identity is authenticated through the comparing step. In further embodiments, the transaction includes an exchange of assets from at least a first account to a second account. Preferably, the first account is associated with the person and the second account is associated with a merchant. In another embodiment, the second account is associated with a financial institution.

In other preferred embodiments, the present invention comprises an apparatus for authentication. The apparatus includes a display field operatively arranged for entry of representative data of a mathematical function of digits in a person's Social Security Number, and an instruction field operatively arranged to display to the person a specific mathematical function to be performed by the person to arrive at the representative data. The apparatus also includes a means for receiving the data representative of the mathematical function of digits in the person's Social Security Number, and an entry field for entering and receiving other data representative of the identity of the person. The apparatus further includes a means for determining the person's Social Security Number from the other data representative of the identity of the person, wherein the means for determining is accomplished by a lookup process in a database. Additionally, the apparatus includes a means for performing the specific mathematical function of digits in the person's Social Security Number, and a means for comparing a result of the performing the specific mathematical function of digits in the person's Social Security Number with the received representative data of the mathematical function of digits in the person's Social Security Number to authenticate the person's identity.

It is an object of the present invention to provide a computer based, non-intrusive method for authentication and verification of a user's identification during purchase transactions on the internet.

These and other objects, features, and advantages of the present invention will become readily apparent to those having ordinary skill in the art upon reading the following detailed description of the invention in view of the several drawings of the invention.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

While the present invention is described with respect to what is presently considered to be the preferred embodiments, it is understood that the invention is not limited to the disclosed embodiments.

Figure 1:
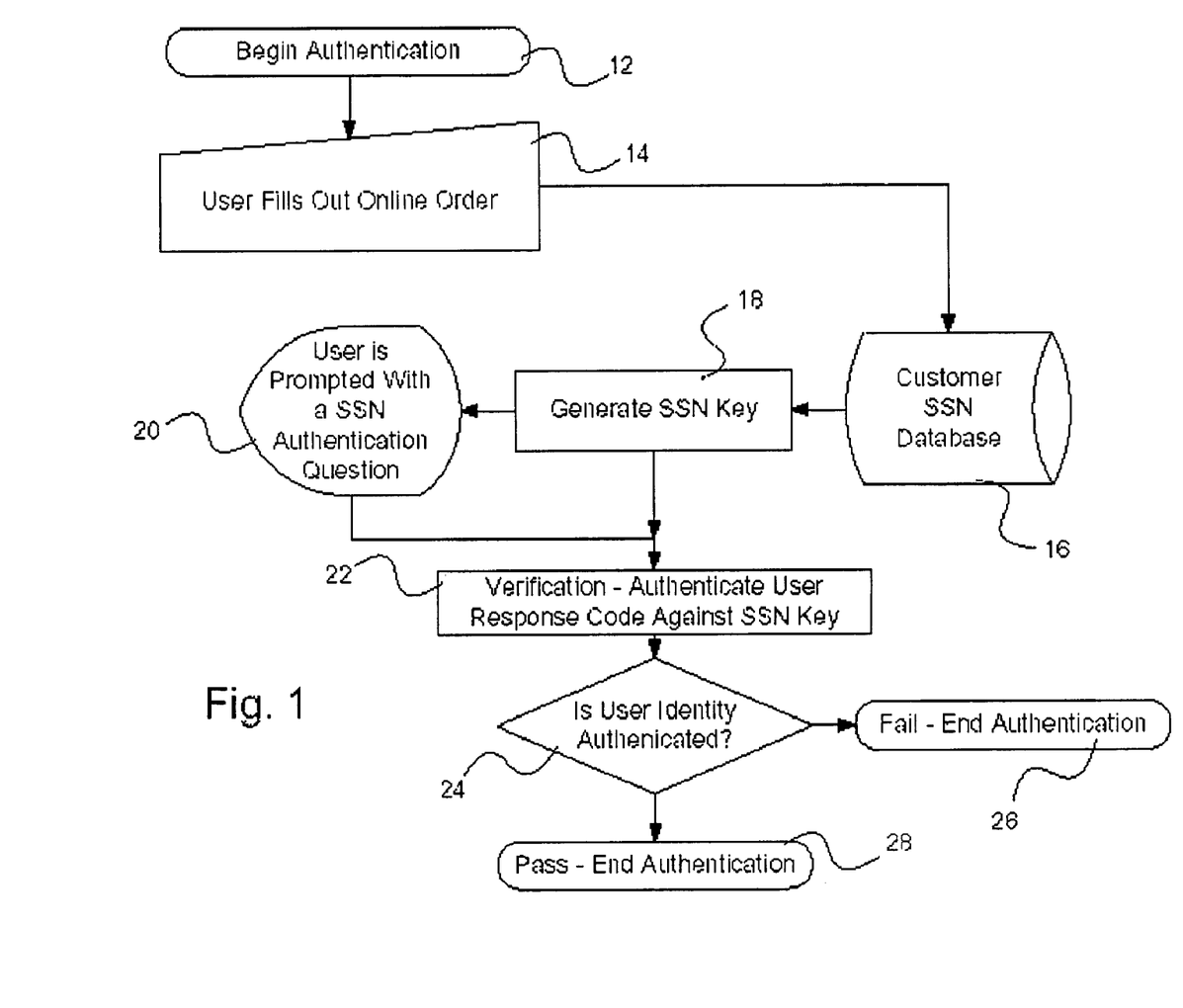
FIG. 1 represents a schematic illustration of a method for carrying out the present invention.

FIG. 1 represents a schematic illustration of a method for carrying out the present invention wherein a user makes an online purchase. The authentication process begins at step 12. The user fills out an online order at step 14. A first number associated with the user is obtained from customer SSN database 16, and then modified with a mathematical function to create a key in step 18. In step 20, the user is then prompted with a SSN authentication question to generate a second number (hereinafter "response code"), wherein the response code is a mathematical function of at least two predetermined digits within the user's identification number. The response code is compared to the key in step 22. If the key is equal to the response code in step 24, the user's identity is authenticated in step 28. Otherwise the authentication fails at step 26.

In general the SSN authentication question involves adding, subtracting, multiplying or dividing any of the combination of numbers within a user's Social Security Number. The user will be prompted via a web site, via a phone clerk or hard-copy for a tally that would have been added, subtracted, multiplied or divided using a specified grouping of numbers within the user's Social Security Number. The customer's response will be either right or wrong (pass or fail), determining if they are using the Social Security Number legitimately or fraudulently.

Figure 2:
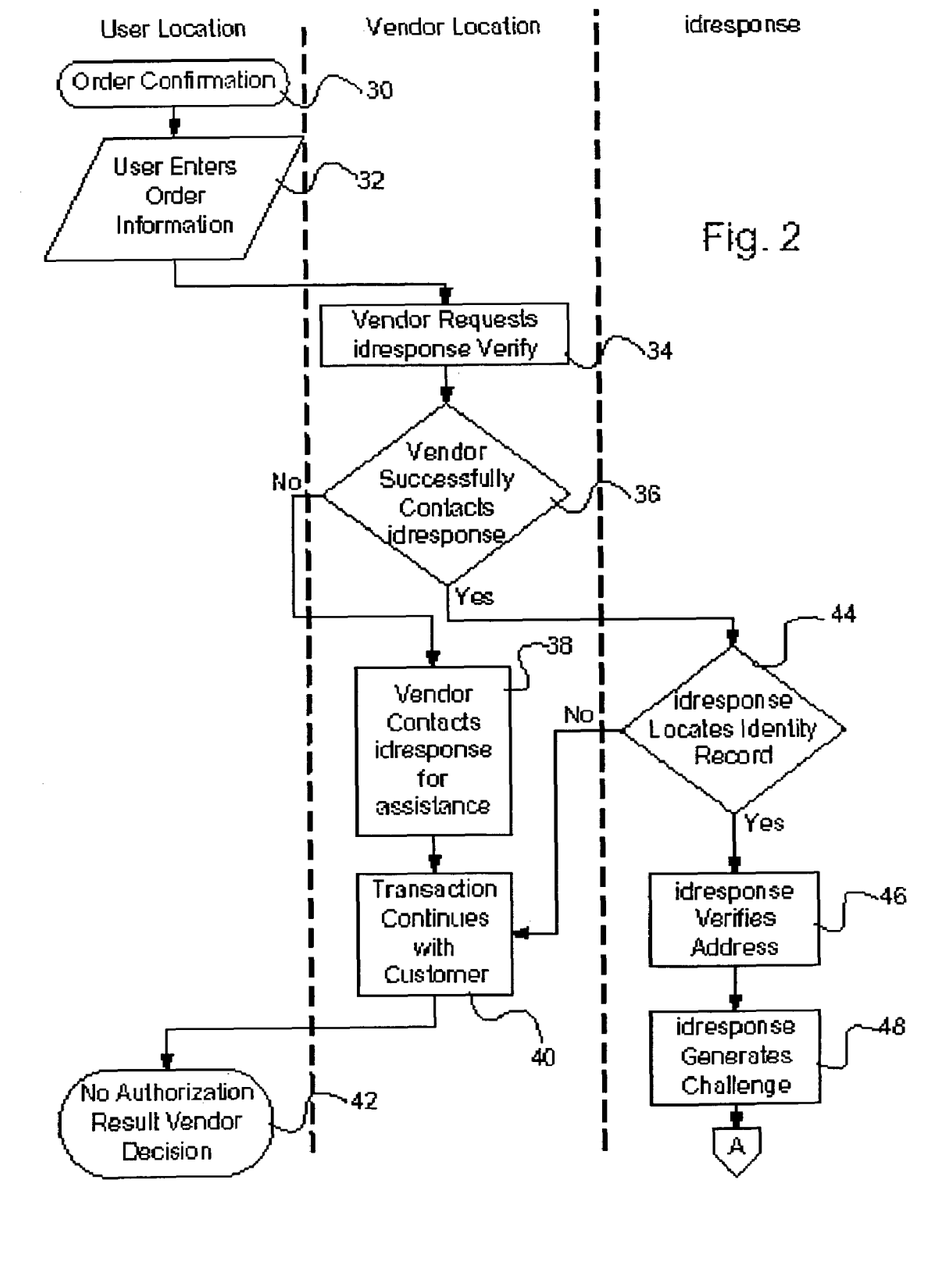
FIG. 2 represents a detailed schematic illustration of the algorithm incorporated into the method of the present invention.
Figure 3:
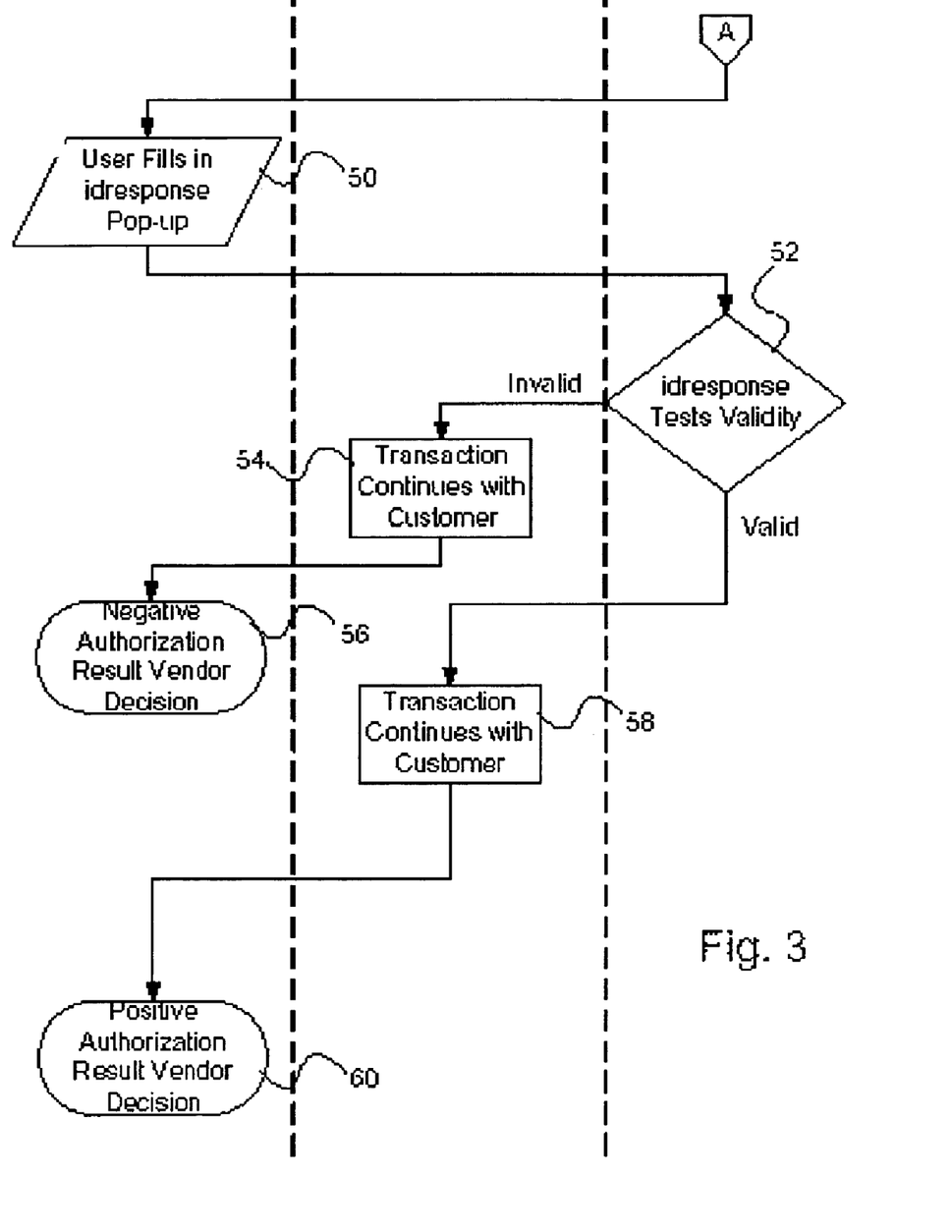
FIG. 3 is a continuation of the algorithm in FIG. 2.

FIGS. 2 and 3 represents a detailed schematic illustration of the algorithm incorporated into the method of the present invention. The term "idresponse" refers to a computer program which a) locates the identity record from a SSN database and verifies the user's "Bill To" and/or "Ship To" address (es), b) generates a challenge with a SSN authentication question, and c) compares the identity record as modified by the idresponse challenge with the user response to the idresponse pop-up. The order confirmation process starts at step 30. The user enters their order information in step 32. This may be accomplished as follows: a) the user/customer goes online or calls the merchants ordering center; b) the user places their order; or c) the Check out process gathers customer information such as: First Name and Last Name, Address Line 1, Address Line 2, City State and Zip, and Phone. The vendor then contacts idresponse in step 34 to request verification of the user's identity. The contact is determined to be successful or unsuccessful in step 36. If unsuccessful, the vendor contacts idresponse for assistance in step 38. The vendor continues the transaction with the customer in step 40. However, as shown in step 42, the transaction is unverifiable.

If idresponse is successfully contacted, idresponse searches for the identity record in step 44. If it is not located, the vendor may continue the transaction as before, but it is again unverifiable. If the identity record is located, idresponse verified the address in step 46. Idresponse then generates the challenge to the user in step 48. The user fills in their response in step 50. Idresponse determines the validity of the response in step 52. If invalid, the transaction may continue with the customer in step 54, but a negative authorization is sent to the vendor (step 56). If verified, the transaction continues with the customer in step 58, and a positive authorization is sent to the vendor (step 60).

In a first example of a mathematical function used to create the key and response code, the user is asked to add the two center digits of their SSN together, and enter the result of the total. If the SSN is 123-45-6789, the user adds 4+5 and enters the result "9." In a second example, the user is asked to add the first and last digits of their SSN together, and give the result of the total. Thus, if the SSN is 123-45-6789, the user adds 1+9 and enters the result "10." In a third example, the user is asked to subtract the first and last digit of their SSN, and give the result of the total. If the SSN is 123-45-6789, the user performs the mathematical function 1−9 and enters the result "−8." In a fourth example, the user is asked to multiply the first and last digits of their SSN together, and give the result of the total. If the SSN is 123-45-6789, the user multiplies 1 by 9 and enters the result "9." In a fifth example, the user is asked to divide the first digit of their SSN by the last digit of their SSN, and enter the result. If the SSN is 123-45-6789, the user divides 1 by 9 and enters the result "1/9." Variations, permutations, and combinations on each of these variables within the embodiments of the invention are also intended to be within the spirit and scope of the invention as claimed.

In another example, a central computer may ask the user to modify the user identification number by performing additional mathematical functions on the at least two predetermined digits. For example, the computer requests that the user add 5 to the sum of the two middle digits of the user's SSN. If the SSN is 123-45-6789, the user adds 5+9 and enters "14."

The mathematical functions or alphabetic translation, or constituent parts thereof, may be applied to parts of all, or all of the user identification number. Thus, the user may be asked to sum all the digits of their SSN so that if the SSN is 123-45-6789, the user enters "45." In a further example, the digit for entry is limited such that the user enters the first digit of the sum of the last four digits of the SSN. The appropriate entry is "3."

In another example, the user is asked to shift their SSN and then perform a mathematical or conversion function. For example, the user shifts the digits by one and then adding one to the sum of the shifted first and second digits. If the SSN is 123-45-6789, the user enters "10."

The present invention also contemplates a comparison method in which several choices are provided and the user selects the appropriate choice based on their user identification number. For example, the user is asked to provide the third and fifth digits of their SSN and choose the letter which corresponds with the correct answer. Thus, if the SSN is 123-45-6789, and choices are given of a) 35 b) 45 c) 12 d) 78, the user chooses a).

Furthermore, the mathematical or conversion functions may be chosen so as to vary randomly from session to session. Also, each session may consist of several SSN authentication questions.

In another aspect of the present invention, the mathematical function may involve addition, subtraction, division, multiplication, square roots, exponents, factorials, or logarithms. Details of some of the mathematical functions that may be used can be found in various references understood by those of skill in the art such as the Handbook of Mathematical Formulas and Integrals by Allen Jeffrey; Academic Press; 2nd edition; (Jan. 15, 2000) incorporated herein in its entirety.

In yet another aspect, the present invention broadly teaches a method for authenticating possession of a user identification number, the method including generating a mathematical formula key, involving, as operands, at least two digits of the user identification number and a mathematical operation involving the at least two digits; providing the mathematical formula key to the user and prompting the user to generate an input code wherein the user calculates the input code from the mathematical formula key; and receiving the input code from the user.

Another aspect of the present invention is a method of authenticating possession of a user identification number by: generating a conversion key, involving, as operands, at least two digits of a user identification number and a translation operation involving the at least two digits; providing the conversion key to the user and prompting the user to generate an input code wherein the user creates the input code from the conversion key; and receiving the input code from the user. In this aspect of the invention, the conversion key may be an alphabetic translation such as the conversion of a number to a letter of the alphabet.

The invention may be further modified to determine whether the user used the user identification number to generate the input code by retrieving from memory the user identification number of the user; calculating a verification code, wherein the verification code is produced by modifying the at least two digits of the user identification number in accordance with the mathematical formula key or the conversion; comparing the input code and the verification code; and providing an authentication signal confirming the identity of the user only if the input code and the verification code are equal.

Figure 4:
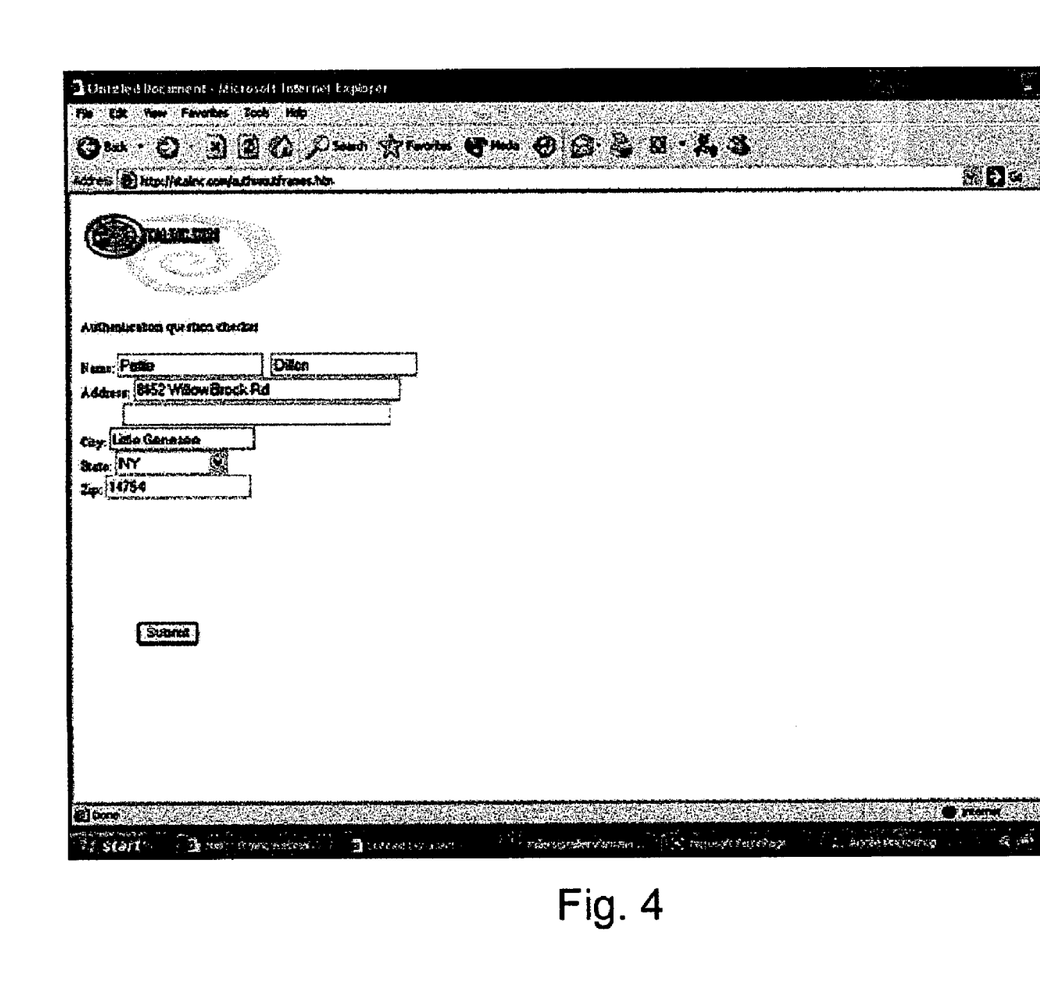
FIG. 4 is a screen capture of the output of an apparatus of the present invention wherein a user enters their personal information.
Figure 5:
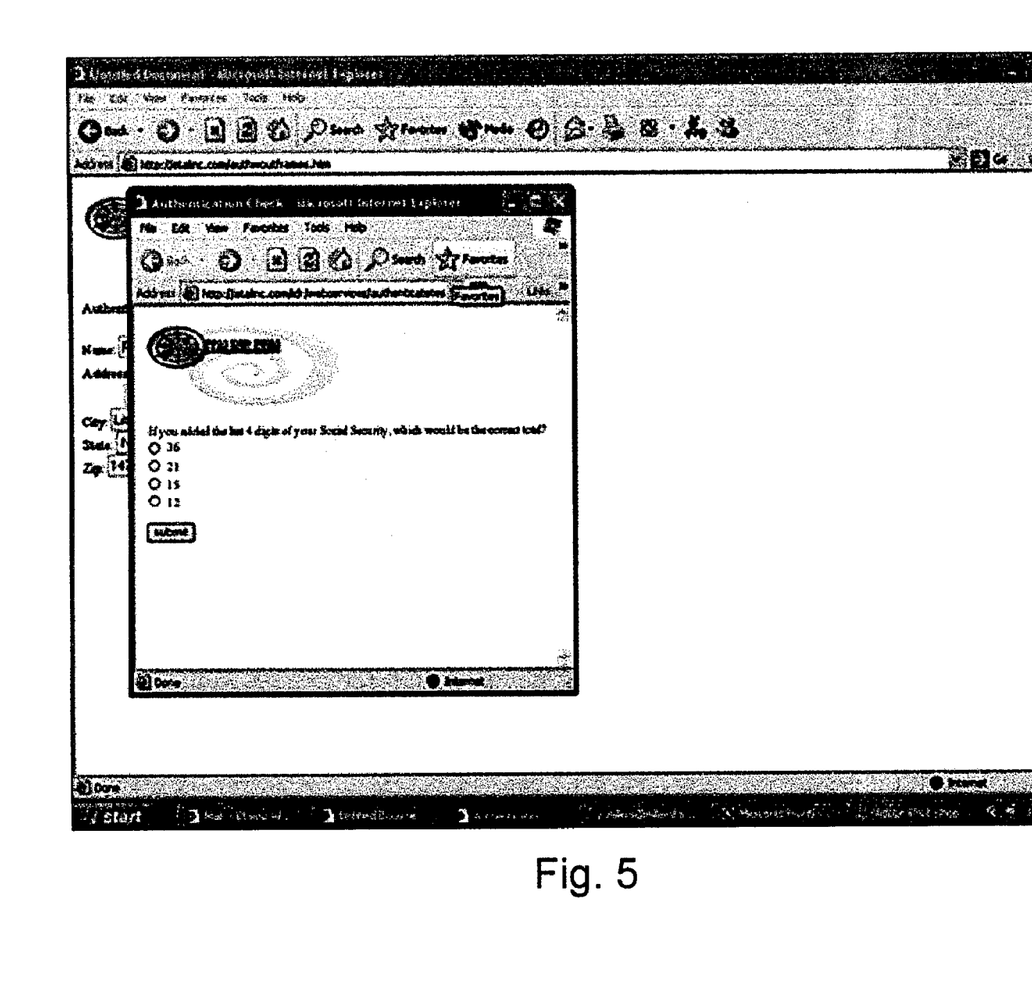
FIG. 5 is a screen capture of the output of an apparatus of the present invention wherein a SSN authentication question is generated.

FIG. 4 is a screen capture of the output of an apparatus of the present invention wherein a user enters their personal information (steps 14 and 32). FIG. 5 is a screen capture output of an apparatus of the present invention wherein a single SSN authentication question is generated (steps 20 and 48). In order to reduce the likelihood of a user randomly arriving at the correct response, the invention contemplates a series of questions requiring repeated congruence between the key and the response code. Additionally, the user may be required to answer a series of questions requiring knowledge of various combinations of the user identification number and personal information.

Figure 6:
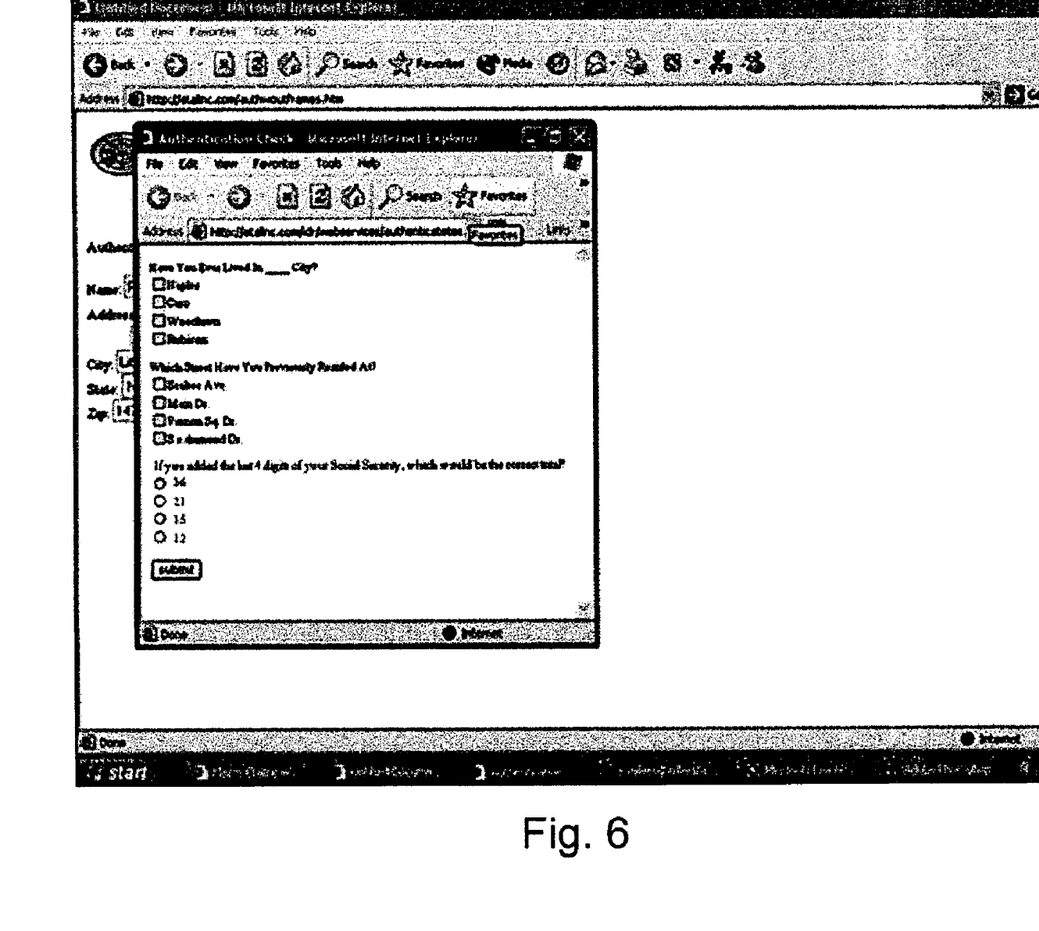
FIG. 6 is a screen capture of the output of an apparatus of the present invention wherein a SSN authentication question is generated, along with two other identity verification questions.
Figure 7:
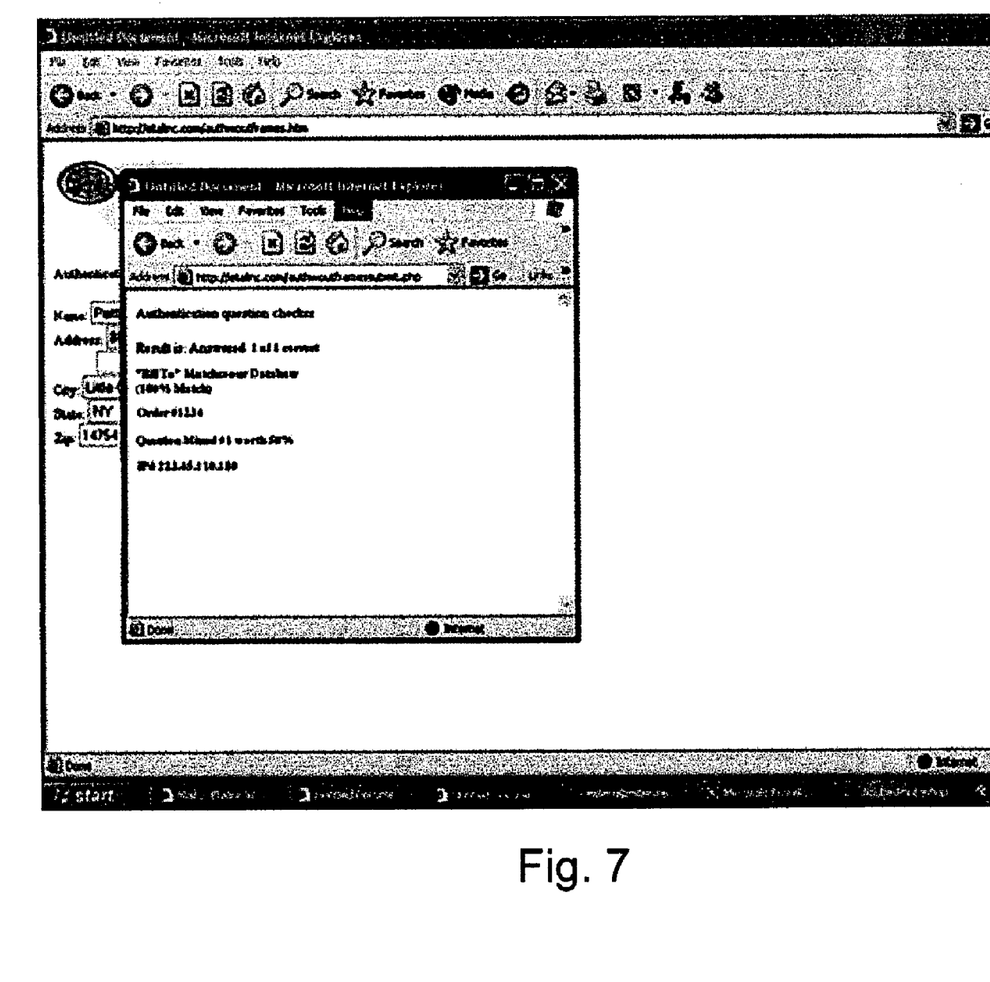
FIG. 7 is a screen capture of the output of an apparatus of the present invention wherein authentication of a user's identification number has been confirmed based on a single SSN authentication question.
Figure 8:
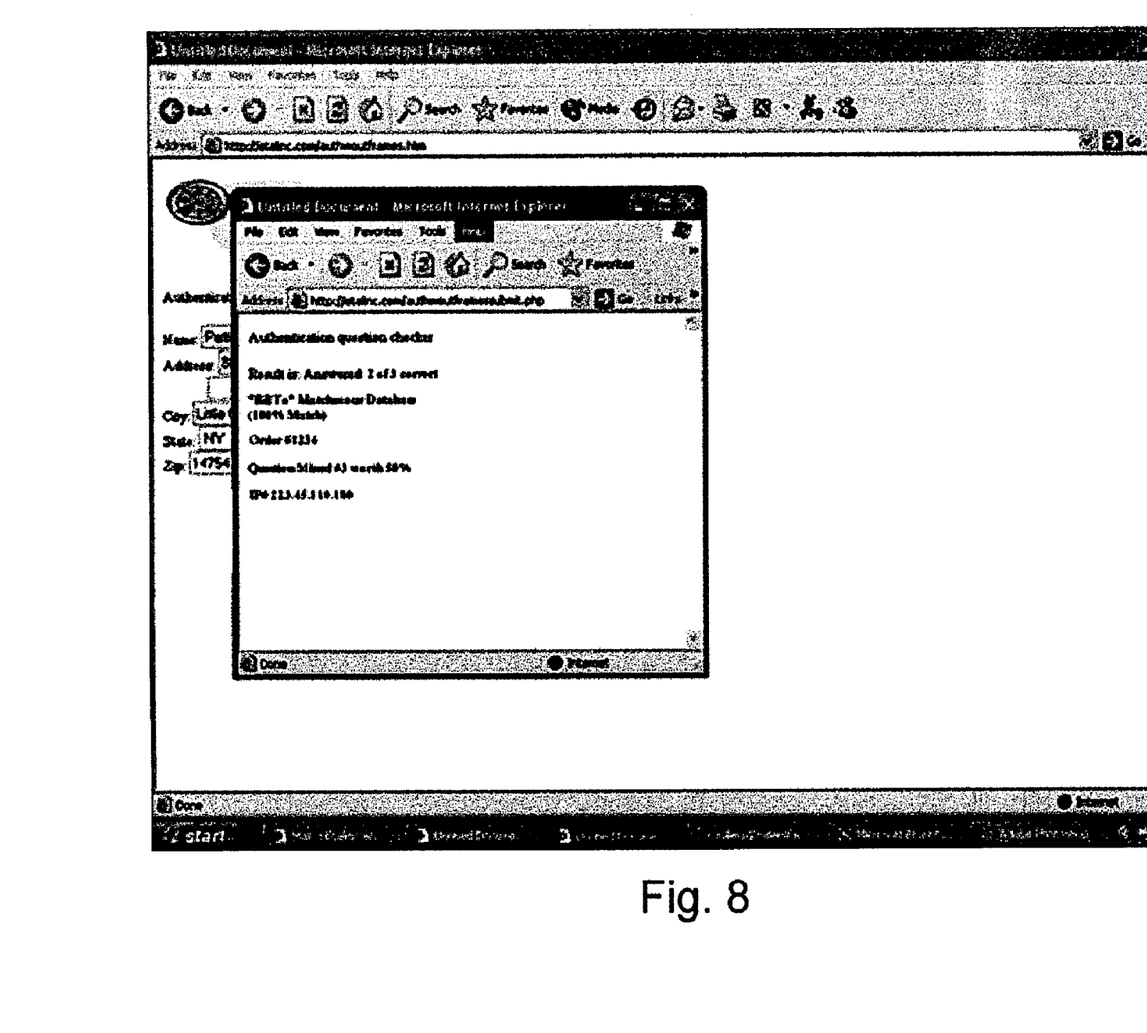
FIG. 8 is a screen capture of the output of an apparatus of the present invention wherein authentication of a user's identification number has been confirmed based on an SSN authentication question and two other identity verification questions.

For example, FIG. 6 is a screen capture output of an apparatus of the present invention wherein an SSN authentication question is generated, along with two other identity verification questions. FIG. 7 is a screen capture output of an apparatus of the present invention wherein authentication of a user's identification number has been confirmed based on the user's correct answer to a single SSN authentication question (steps 28 and 60). FIG. 8 is a screen capture output of an apparatus of the present invention wherein the user's identity is verified based on the user's answers to an SSN authentication question and two identity verification questions. It should be readily apparent to one skilled in the art that the identity verification questions shown in the figures are two examples that can be constructed from the identity information kept in databases known in the art. Methods and apparatuses using different questions are within the spirit and scope of the invention as claimed.

In the above example, the authentication question refers to a mathematical modification of the user's SSN. However, in another aspect of the invention, the authentication question may require the user to generate an alphabetic or alphanumeric second code/number. An alphabetic translation may, for example, require the conversion of a number to a letter of the alphabet. The user may be provided a conversion or translation key wherein 0=A; 1=B; 2=C; 3=D; 4=E; 5=F; 6=G; 7=H; 8=I; and 9=J. The authentication question may then request that the user enter the alphabetic translation of the last four digits of the user's SSN. If the SSN is 123-45-6789, authentication would occur if the user entered "GHIJ". Conversions involving symbols, non-English characters, ideograms, and any other methods known in the art are within the spirit and scope of the invention as claimed.

In alternative embodiments, the present invention may be used to prevent eavesdropping on any user information entered by the user, whether numeric or alphanumeric, and whether a short code or longer blocks of information. In any event, the user information which is to be protected is referred to herein as a user identification number.

It will be understood that, in general, the present invention may be utilized any time a remotely-located agent or computer requests a user entering information into a potentially publicly visible terminal (where "visible" in this sense includes all forms of eavesdropping on all forms of information entry) such as a computer connected to the internet. The computer in general supplies the user with certain mathematical or alphabet conversions and asks the user to use these conversions to provide a converted version of the information to the computer. Thus, the user may still supply confirming information to the computer or agent that the user indeed is in possession of the confidential information, without the user publicly exhibiting the actual data, but only a converted version of it.

As will be understood, in alternative embodiments a human agent may be employed to perform the heretofore described functions of a central computer.

As will further be understood, although account-related transactions associated with remote terminals is described herein above, in alternative preferred embodiments users may need to enter their SSN or other confidential information into a data entry terminal that is not necessarily remotely connected with a remote database, computer, or other facilities of the company managing the account. For instance, a user may enter data into a data entry terminal such as a self-contained automatic teller machine in an airport or other public location, which is able to process the user's transaction without remote communication. In this case, for example, the user may listen to instructions or data entry prompts from a hand-held speaker similar to that used with telephones, so that the mathematical or alphabetic conversions directed to the user are not audible to unauthorized users who may be nearby. The user may then supply his account or other information after converting it in accordance with the terminal's prompts, for instance by speaking the information vocally into a microphone in the mouthpiece or by entering the data into a keypad. Similarly, a telephone or telecommunications terminal may conceivably perform locally database and related functions described hereinabove. In another embodiment, a self-contained device such as the user's laptop may require the user to enter confidential passwords or other user codes to access some information or applications. In this context as well, an embodiment of the present invention may be utilized.

The present invention can benefit the user and the account company by reducing the costs associated resulting from instances of fraud and identity theft and from the very possibility of such fraud and theft, and should also make the services of a company utilizing the techniques of the present invention more attractive to users desiring confidentiality for social security numbers, account numbers and related information.

The present invention can also be embodied in the form of computer-implemented processes and apparatuses for practicing those processes. The present invention can also be embodied in the form of computer program code embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted as a propagated computer data or other signal over some transmission or propagation medium, such as over electrical wiring or cabling, through fiber optics, or via electromagnetic radiation, or otherwise embodied in a carrier wave, wherein, when the computer program code is loaded into and executed by a computer, the computer becomes an apparatus for practicing the invention. When implemented on a future general-purpose microprocessor sufficient to carry out the present invention, the computer program code segments configure the microprocessor to create specific logic circuits to carry out the desired process.

Thus it is seen that the objects of the invention are efficiently obtained, although changes and modifications to the invention should be readily apparent to those having ordinary skill in the art, which changes are considered to be within the scope of the invention as claimed. Variations, permutations, and combinations on such embodiments are also intended to be within the spirit and scope of the invention as claimed.

The invention claimed is:

1. A computer based method of authentication, comprising the steps of:
    (a) displaying a field operatively arranged for entry of data representative of a first mathematical function of a first set of digits in a person's Social Security Number, wherein said first set of digits comprises any plurality of different digits of said Social Security Number;
    (b) displaying instructions to said person indicating said first mathematical function to be performed by said person to arrive at said representative data;
    (c) displaying a field operatively arranged for entry of other data representative of the identity of said person;
    (d) receiving said data representative of said first mathematical function of said first set of digits in said person's Social Security Number with a processor;
    (e) receiving other data representative of the identity of said person with said processor;
    (f) determining said person's Social Security Number from said other data representative of the identity of said person, wherein said determining is accomplished by a lookup process in a database with said processor;
    (g) performing said first mathematical function of said first set of digits in said person's Social Security Number with said processor;
    (h) comparing a result of said performing said first mathematical function of said first set of digits in said person's Social Security Number with said received data representative of said first mathematical function of said first set of digits in said person's Social Security Number with said processor to authenticate said person's identity; and
    (i) repeating at least steps (a)-(d) and (g)-(h) with new instructions for a second mathematical formula on a second set of digits in said Social Security Number if said comparing step (h) yields a match, wherein said second set of digits differs from said first set of digits and/or said second mathematical function differs from said first mathematical function.

2. The method of claim 1, wherein said first and second mathematical functions are selected from the group consisting of addition, subtraction, division, multiplication, and combinations thereof.

3. The method of claim 1, said other data selected from the group consisting of said person's first and last name, bill to and ship to addresses, phone number, and combinations thereof.

4. The method of claim 1, said other data comprising said person's first and last name, bill to and ship to addresses, phone number, and combinations thereof.

5. The method of claim 1, said database comprising:
    a plurality of entries, each of said entries identifying one individual, said entries comprising at least said individual's Social Security Number and said other data, said other data selected from the group consisting of said individual's first and last name, bill to and ship to addresses, phone number, and combinations thereof.

6. The method of claim 1, further comprising the step of:
    (j) denying authorization of a transaction if said person's identity is not authenticated through both said comparing step (h) and repeating said comparing step (h).

7. The method of claim 1, further comprising the step of:
    (k) authorizing a transaction if said person's identity is authenticated through both said comparing step (h) and repeating said comparing step (h).

8. The method of claim 7, said transaction being an exchange of assets from at least a first account to a second account.

9. The method of claim 8, said first account associated with said person and said second account associated with a merchant.

10. The method of claim 8, said first account associated with said person and said second account associated with a financial institution.

11. The method of claim 1, said steps of displaying a field operatively arranged for entry of data representative of a mathematical function of digits in a person's Social Security Number, displaying instructions to said person, and displaying a field operatively arranged for entry of other data representative of the identity of said person occurring substantially simultaneously.

12. An apparatus for authentication, comprising:
a processor;
a storage medium comprising software instructions which, when executed by said processor, perform a method of authentication, said method comprising the steps of:
(a) displaying a field operatively arranged for entry of data representative of a first mathematical function of a first set of digits in a person's Social Security Number, wherein said first set of digits comprises any plurality of different digits of said Social Security Number;
(b) displaying instructions to said person indicating said first mathematical function to be performed by said person to arrive at said representative data;
(c) displaying a field operatively arranged for entry of other data representative of the identity of said person;
(d) receiving said data representative of said first mathematical function of said first set of digits in said person's Social Security Number;
(e) receiving other data representative of the identity of said person;
(f) determining said person's Social Security Number from said other data representative of the identity of said person, wherein said determining is accomplished by a lookup process in a database;
(g) performing said first mathematical function of said first set of digits in said person's Social Security Number;
(h) comparing a result of said performing said first mathematical function of said first set of digits in said person's Social Security Number with said received data representative of said first mathematical function of said first set of digits in said person's Social Security Number to authenticate said person's identity; and
(i) repeating at least steps (a)-(d) and (g)-(h) with new instructions for a second mathematical formula on a second set of digits in said Social Security Number if said comparing step (h) yields a match, wherein said second set of digits differs from said first set of digits and/or said second mathematical function differs from said first mathematical function.

13. A computer based method of authentication, comprising the steps of:
(a) displaying a field operatively arranged for entry of data representative of a first mathematical function performed on a first set of exactly two digits in a person's Social Security Number, only;
(b) displaying instructions to said person indicating said first mathematical function to be performed by said person on said first set of exactly two digits in said Social Security Number to arrive at said representative data;
(c) displaying a field operatively arranged for entry of other data representative of the identity of said person;
(d) receiving said data representative of said first mathematical function performed on said first set of exactly two digits in said person's Social Security Number with a processor;
(e) receiving other data representative of the identity of said person with said processor;
(f) determining said person's Social Security Number from said other data representative of the identity of said person, wherein said determining is accomplished by a lookup process in a database with said processor;
(g) performing said first mathematical function on said exactly first set of two digits in said person's Social Security Number, only, with said processor;
(h) comparing a result of said performing said first mathematical function on said exactly first set of two digits in said person's Social Security Number with said received data representative of said first mathematical function performed on said exactly first set of two digits in said person's Social Security Number with said processor to authenticate said person's identity; and
(i) repeating at least steps (a)-(d) and (g)-(h) with new instructions for a second mathematical formula on a second set of exactly two digits in said Social Security Number if said comparing step (h) yields a match, wherein said second set of exactly two digits differs from said first set of exactly two digits and/or said second mathematical function differs from said first mathematical function.

14. An apparatus for authentication, comprising:
a processor;
a storage medium comprising software instructions which, when executed by said processor, perform a method of authentication, said method comprising the steps of:
(a) displaying a field operatively arranged for entry of data representative of a first mathematical function performed on a first set of exactly two digits in a person's Social Security Number, only;
(b) displaying instructions to said person indicating said first mathematical function to be performed by said person on said first set of exactly two digits in said Social Security Number to arrive at said representative data;
(c) displaying a field operatively arranged for entry of other data representative of the identity of said person;
(d) receiving said data representative of said first mathematical function performed on said first set of exactly two digits in said person's Social Security Number;
(e) receiving other data representative of the identity of said person;
(f) determining said person's Social Security Number from said other data representative of the identity of said person, wherein said determining is accomplished by a lookup process in a database;
(g) performing said first mathematical function on said first set of exactly two digits in said person's Social Security Number, only;
(h) comparing a result of said performing said first mathematical function on said first set of exactly two digits in said person's Social Security Number with said received data representative of said first mathematical function performed on said first set of exactly two digits in said person's Social Security Number to authenticate said person's identity; and
(i) repeating at least steps (a)-(d) and (g)-(h) with new instructions for a second mathematical formula on a second set of exactly two digits in said Social Security Number if said comparing step (h) yields a match, wherein said second set of exactly two digits differs from said first set of exactly two digits and/or said second mathematical function differs from said first mathematical function.

15. A computer based method of authentication, comprising the steps of:
(a) randomly generating a first mathematical function to be performed on a first set of digits in a person's Social Security Number with a processor;

(b) displaying a field operatively arranged for entry of data representative of said first mathematical function of said first set of digits in said person's Social Security Number;

(c) displaying instructions to said person indicating said first mathematical function to be performed by said person to arrive at said representative data;

(d) displaying a field operatively arranged for entry of other data representative of the identity of said person;

(e) receiving said data representative of said first mathematical function of said first set of digits in said person's Social Security Number with said processor;

(f) receiving other data representative of the identity of said person with said processor;

(g) determining said person's Social Security Number from said other data representative of the identity of said person, wherein said determining is accomplished by a lookup process in a database with said processor;

(h) performing said first mathematical function on said first set of digits in said person's Social Security Number with said processor;

(i) comparing a result of said performing said first mathematical function of said first set of digits in said person's Social Security Number with said received data representative of said first mathematical function of said first set of digits in said person's Social Security Number with said processor to authenticate said person's identity; and (j) repeating at least steps (a)-(e) and (h)-(i) with new instructions for a second mathematical formula on a second set of digits in said Social Security Number if said comparing step (i) yields a match, wherein said second set of digits differs from said first set of digits and/or said second mathematical function differs from said first mathematical function.

16. An apparatus for authentication, comprising:

a processor;

a storage medium comprising software instructions which, when executed by said processor, perform a method of authentication, said method comprising the steps of:

(a) randomly generating a first mathematical function to be performed on a first set of digits in a person's Social Security Number;

(b) displaying a field operatively arranged for entry of data representative of said first mathematical function of said first set of digits in said person's Social Security Number;

(c) displaying instructions to said person indicating said first mathematical function to be performed by said person to arrive at said representative data;

(d) displaying a field operatively arranged for entry of other data representative of the identity of said person;

(e) receiving said data representative of said first mathematical function of said first set of digits in said person's Social Security Number;

(f) receiving other data representative of the identity of said person;

(g) determining said person's Social Security Number from said other data representative of the identity of said person, wherein said determining is accomplished by a lookup process in a database;

(h) performing said first mathematical function on said first set of digits in said person's Social Security Number;

(i) comparing a result of said performing said first mathematical function of said first set of digits in said person's Social Security Number with said received data representative of said first mathematical function of said first set of digits in said person's Social Security Number to authenticate said person's identity; and (j) repeating at least steps (a)-(e) and (h)-(i) with new instructions for a second mathematical formula on a second set of digits in said Social Security Number if said comparing step (i) yields a match, wherein said second set of digits differs from said first set of digits and/or said second mathematical function differs from said first mathematical function.

17. A computer based method of authentication, comprising the steps of:

(a) forming a first single group of digits by choosing a plurality of different digits from a person's Social Security Number with a processor;

(b) displaying a field operatively arranged for entry of data representative of a first mathematical function performed on said first single group of digits only;

(c) displaying instructions to said person indicating said first mathematical function to be performed on said first single group of digits by said person to arrive at said representative data;

(d) displaying a field operatively arranged for entry of other data representative of the identity of said person;

(e) receiving said data representative of said first mathematical function performed on said first group of digits with said processor;

(f) receiving other data representative of the identity of said person with said processor;

(g) determining said person's Social Security Number from said other data representative of the identity of said person, wherein said determining is accomplished by a lookup process in a database with said processor;

(h) performing said first mathematical function on said first single group of digits only with said processor;

(i) comparing a result of said performing said first mathematical function on said first group of digits formed from said person's Social Security Number with said received data representative of said first mathematical function performed on said first single group of digits only with said processor to authenticate said person's identity;

(j) repeating at least steps (a)-(e) and (h)-(i) with new instructions for a second mathematical formula on a second single group of digits in said Social Security Number if said comparing step (i) yields a match, wherein said second single group of digits differs from said first single group of digits and/or said second mathematical function differs from said first mathematical function.

18. An apparatus for authentication, comprising:

a processor;

a storage medium comprising software instructions which, when executed by said processor, perform a method of authentication, said method comprising the steps of:

(a) forming a first single group of digits by choosing a plurality of different digits from a person's Social Security Number;

(b) displaying a field operatively arranged for entry of data representative of a first mathematical function performed on said first single group of digits only;

(c) displaying instructions to said person indicating said first mathematical function to be performed on said first single group of digits by said person to arrive at said representative data;

(d) displaying a field operatively arranged for entry of other data representative of the identity of said person;
(e) receiving said data representative of said first mathematical function performed on said first group of digits;
(f) receiving other data representative of the identity of said person;
(g) determining said person's Social Security Number from said other data representative of the identity of said person, wherein said determining is accomplished by a lookup process in a database;
(h) performing said first mathematical function on said first single group of digits only;
(i) comparing a result of said performing said first mathematical function on said first group of digits formed from said person's Social Security Number with said received data representative of said first mathematical function performed on said first single group of digits only to authenticate said person's identity;
(j) repeating at least steps (a)-(e) and (h)-(i) with new instructions for a second mathematical formula on a second single group of digits in said Social Security Number if said comparing step (i) yields a match, wherein said second single group of digits differs from said first single group of digits and/or said second mathematical function differs from said first mathematical function.

* * * * *